United States Patent [19]
Michel et al.

[11] Patent Number: 4,731,724
[45] Date of Patent: Mar. 15, 1988

[54] SYSTEM FOR SIMULTANEOUS TRANSMISSION OF DATA BLOCKS OR VECTORS BETWEEN A MEMORY AND ONE OR A NUMBER OF DATA-PROCESSING UNITS

[75] Inventors: Claude Michel, Asnieres; Noureddine M'Rabet, Pantin, both of France

[73] Assignee: Sintra, Asniere, France

[21] Appl. No.: 799,854

[22] Filed: Nov. 20, 1985

[30] Foreign Application Priority Data

Nov. 23, 1984 [FR] France .................. 84 17932

[51] Int. Cl.⁴ .................. G06F 13/00; G06F 15/16
[52] U.S. Cl. .................. 364/200
[58] Field of Search ... 364/200 MS File, 900 MS File

[56] References Cited

U.S. PATENT DOCUMENTS

| | | | |
|---|---|---|---|
| 4,204,251 | 5/1980 | Brudevold | 364/200 |
| 4,484,262 | 11/1984 | Sullivan et al. | 364/200 |
| 4,621,339 | 11/1986 | Wagner et al. | 364/900 |

Primary Examiner—Eddie P. Chan
Attorney, Agent, or Firm—Oblon, Fisher, Spivak, McClelland & Maier

[57] ABSTRACT

A system for simultaneous transmission of data blocks or vectors between a memory and one or a number of data-processing units having a memory which is subdivided into a whole number N of logic arrays of n physical arrays of q memory locations. An interconnection network controlled by a control logic device establishes the connections between the logic arrays of the memory and the data-processing units. Addressing devices controlled respectively by a data-processing unit have the function of addressing the memory locations to which each data-processing unit requests access. The control logic device has logic for establishing a connection between each requesting unit and the logic array containing the address of the start of the vector or data block to be transferred and control means for successively switching the requesting unit to the following logic arrays at the end of each data transfer between a logic array of the memory and the requesting data-processing unit.

6 Claims, 9 Drawing Figures

SYSTEM FOR SIMULTANEOUS TRANSMISSION OF DATA BLOCKS OR VECTORS BETWEEN A MEMORY AND ONE OR A NUMBER OF DATA-PROCESSING UNITS

BACKGROUND OF THE INVENTION

1. Field of the Invention

The present invention relates to a system for simultaneous transmission of data blocks or vectors between a memory and one or a number of data-processing units.

The invention is more particularly concerned with systems in which the data-processing units operate and execute programs asynchronously with respect to each other.

2. Description of the Prior Art

In known systems, the communication of data between a plurality of processing units which operate in parallel in order to execute the same program or different programs assumes a number of different forms which can be classed together under two general headings corresponding to two different operating modes. In a first mode designated by the acronym SIMD (Single-Instruction Multiple-Data Stream), data exchanges take place in a synchronous mode in which a single instruction sets a data rate for all the elementary processors. Enhancement of performances is obtained by causing a large number of processing units to carry out the same instruction. When using machines designed for operation in the SIMD mode, it is consequently possible to work on data tables or vectors instead of scalars. For example, a single instruction can carry out operations on several series of numbers belonging to one table.

In a second mode designated by the acronym MIMD (Multiple-Instruction Multiple-Data Stream), enhanced performances are obtained by carrying out a plurality of instructions belonging to different programs by means of different processing units, these instructions being executed simultaneously and on different data. However, the systems which operate in the MIMD mode are subject to many practical difficulties in regard to settlement of conflicts arising from access to data shared between all the processing units, in regard to efficient management of resources, synchronization mechanisms to be employed, and in regard to the management of concurrent processing tasks. These difficulties naturally lead to an appreciable falloff in performances.

Although the two SIMD and MIMD modes would appear a priori to be complementary, a comparison between these two techniques points to an apparent contradiction between the fact that the first system offers the possibility of achieving a higher data rate and the fact that the second system makes it possible to execute the maximum number of instructions. By making use of an MIMD system, the greatest possible benefit could in fact be derived from the parallel execution of a program if there did not exist any conflicts between the accesses to the common memory shared by the processing units. In contrast, although the SIMD systems appear to be more rigid in regard to sequencing of instructions since only identical operations can be performed simultaneously, the apparent constraint mentioned above is turned to useful account by these systems for the purpose of ensuring more effective parallel access to data.

SUMMARY OF THE INVENTION

The object of the invention is to limit the disadvantages mentioned in the foregoing and in particular to avoid memory access conflicts in an MIMD organization in which each processor could operate in the SIMD mode.

To this end, the invention is directed to a system for simultaneous transmission of data blocks or vectors between a memory and one or a plurality of data-processing units designed for asynchronous operation with respect to each other. The distinctive feature of the invention lies in the fact that the memory is composed of a whole number N of storage logic arrays each comprising any whole number n of physical arrays of q storage locations, that the system comprises an interconnection network interposed between the memory and the processing units for establishing connections between the memory arrays and said processing units, a control logic device for controlling the connection paths within the connection network as well as one or a number of addressing logic devices controlled respectively by a data-processing unit for addressing the locations of the memory to which each unit requests access and carrying out block transfer of the data contained in the corresponding locations. The N.n physical arrays of the memory are juxtaposed and numbered in the order of the natural integers $0, \ldots [(N.n)-1]$ so as to form an ordered matrix base of storage locations. Each storage location in a physical array is located at the point of intersection of a line and a column of the matrix base and is also numbered on each line in the order of increasing magnitude of the natural integers from the start-of-line location contained in the first physical array 0 of the memory to the end-of-line location contained in the last physical array $[(N.n)-1]$ of the memory. All the start-of-line locations of the memory are located within a first physical array. Each addressing logic device comprises means for determining the address of each location in the physical arra by computing the modulo (N.n) address of its physical array from its sequence number in the memory. The control logic device comprises means for establishing a connection between a requesting data-processing unit and the logic array containing the address of the start of the data block to be transferred and switching means for successively switching the requesting data-processing unit to the following logic arrays at the end of each data transfer between a logic array of the memory and the data-processing unit.

The advantage of the present invention lies in the fact that the connection of all the data-processing units can be established simultaneously without conflict. Once the processing-unit connection has been established, the transfer of an entire data block or of a vector continues without interruption until the transfer of the last data item of the block or of the vector. In addition, the arrangement of the system in accordance with the invention has the advantage of achieving maximum utilization of all the physical arrays of the memory and thus permitting operation of the interconnection network with a constant data rate.

BRIEF DESCRIPTION OF THE DRAWINGS

Other features of the invention will be more apparent upon consideration of the following description and accompanying drawings, wherein.

DETAILED DESCRIPTION OF THE INVENTION

Figure 1:
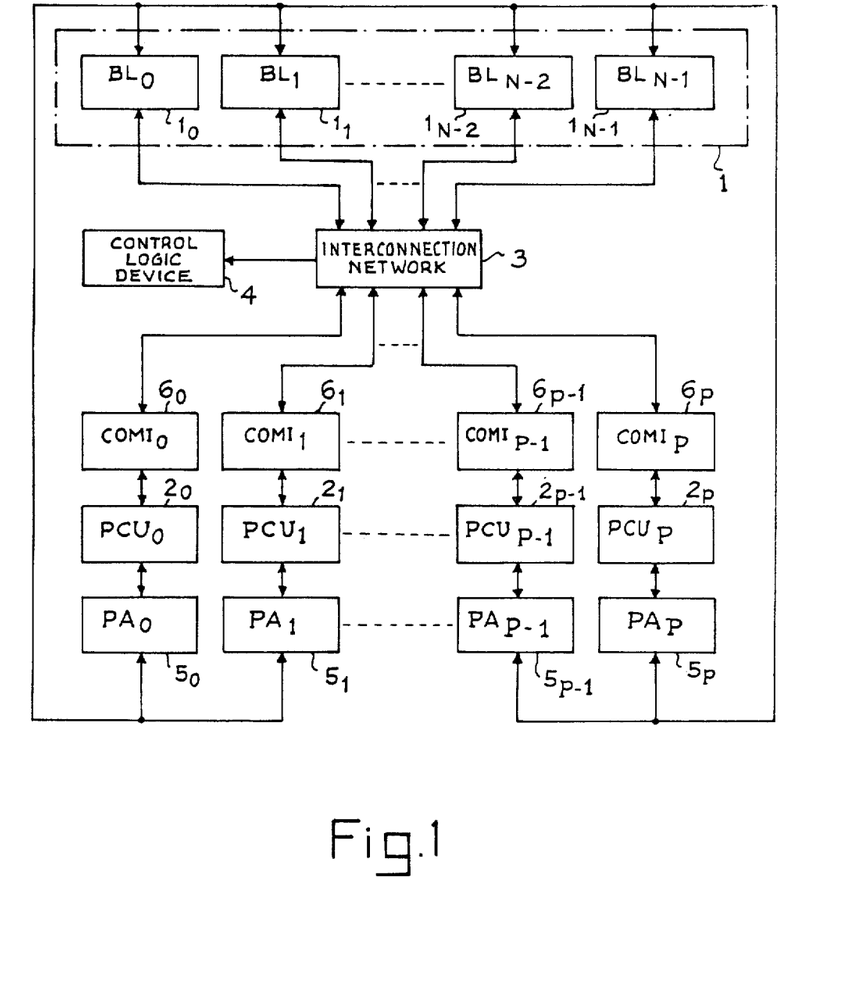
FIG. 1 is a schematic diagram showing the principle of construction of the data-transmission system in accordance with the invention.

The data-transmission system shown in FIG. 1 comprises a memory 1 represented within a chain-dotted-line rectangle which is split into N logic arrays $BL_0$, $BL_1 \ldots BL_{n-2}$, $BL_{n-1}$ located within rectangles designated respectively by the references $l_0$ to $l_{N-1}$. The system represented in the figure further comprises an assembly of P+1 data-processing units having the respective notations PCU0, PCU1 etc . . . $PCU_{p-1}$ and $PCU_p$, and shown within rectangles designated respectively by the references $2_0, 2_1, \ldots 2_{p-1}, 2_p$. An interconnection network 3 establishes the connections between the processing units $2_0$ to $2_p$ and the logic arrays $l_0$ to $l_{N-1}$. The interconnection network 3 is controlled from a control logic 4. Address processors denoted respectively by $PA_0$, $PA_1$ etc . . . $PA_{p-1}$, $PA_p$ and bearing the references $5_0$ to $5_p$ are connected to the addressing inputs of the memory 1 in order to permit computation of the address of each element to be extracted from the arrays of the memory 1. Devices for rearrangement of extracted data designated respectively by $COMI_0$, $COMI_1$ etc . . . $COMI_{p-1}$, $COMI_p$ within rectangles numbered from $6_0$ to $6_p$ are interposed between the interconnection network 3 and the processing units PCU0, PCU1 to PCUp so as to rearrange the data extracted from the memory 1 in the order in which they were recorded in the memory 1.

In accordance with the invention, splitting of the memory 1 into logic arrays permits parallel access by all the processing units to the storage arrays of the memory. This parallelism is obtained by means of the interconnection network which connects each logic array to a single processing unit at a given instant. However, each logic array can contain a number n of physical arrays or so-called pipeline systems, thus enabling each logic array to store n consecutive words or data within said n physical arrays. One example of subdivision of a memory space into physical arrays and logic arrays is shown in FIG. 2.

Figure 2:
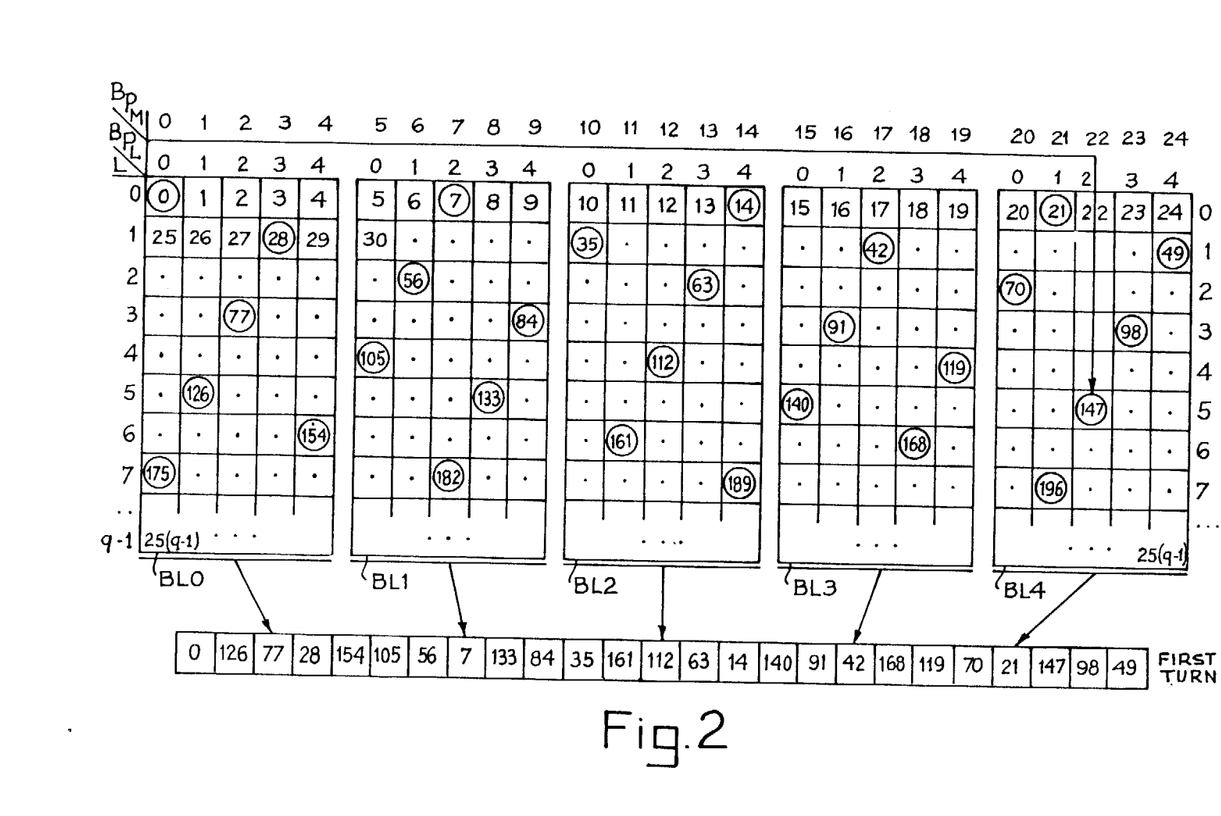
FIG. 2 is a table showing an example of organization of a memory consisting of twenty-five physical arrays equally distributed within five logic arrays and illustrating the principle of extraction of data from the memory in accordance with the invention.

The space of the memory 1 which is illustrated in FIG. 2 in the form of a matrix of 25×q storage locations placed at the intersections of twenty-five columns and of q lines $L_0$ to $L_{q-1}$ is materialized by twenty-five physical arrays of q juxtaposed memory locations. Each line comprises twenty-five memory locations numbered in the order of an arithmetical progression having a common difference of 1, the number of each location which marks the start of a line being obtained from the last number of the location which marks the end of the previous line increased by one unit. The line $L_0$ contains the locations numbered from 0 to 24, the following line $L_1$ contains the locations numbered from 25 to 49 etc . . . and the last line $L_{q-1}$ contains the locations numbered from 25(q-1) to 25 q-1. In order to illustrate a mode of operation of the data-transmission system in accordance with the invention, it will be supposed with reference to FIG. 2 that, at a given instant, a processing unit desires to extract from the memory space all the "articles" or "data" contained in the memory locations having numbers which are multiples of 7, starting with the article or the datum of N° 0. In this case, the processing unit must first be connected to the array $BL_0$ in which the first article of N° 0 is located, then successively to the following logic arrays $BL_1$ to $BL_4$ in order to extract all the articles which are multiples of 7 and the numbers of which are surrounded by a small circle as shown in FIG. 2. During this first reading of the logic arrays $BL_0$ to $BL_4$, the processing unit will extract in sequence the first elements or articles delivered by each physical array, namely the sequence of articles or data corresponding to the locations numbered 0, 126, 77, 28, 154 . . . 98 and 49. On completion of this initial reading operation, the processing unit leaves the logic array $BL_4$ and then returns by circular permutation to a further reading of the logic array $BL_0$, then moves successively to the logic arrays $BL_1$, $BL_2$, $BL_3$ and $BL_4$ so as to extract during this second revolution those articles or data which are present at the locations numbered 175, 301, 252, 203, 329 . . . 273 and 224. Several logic array reading operations can thus be performed by a single processing unit in accordance with the principle described above as long as the set of data or articles constituting the vector or data block has not been entirely transferred. In the example which has just been described, the vector extracted from memory is made up of a series of vectors or scalars in which the sequence of addresses in memory follows an arithmetical progression which satisfies the following relation $$A_k = A_o + kR \tag{1}$$

where $A_k$, $A_o$, k and R designate respectively the address of the $k^{th}$ article or of the $k^{th}$ datum within the vector, $A_o$ designates the starting address of the first article or of the first datum of the vector, k designates the order number or sequence number of the article or datum in the vector and R designates the ratio (common difference). By adopting the same addressing principle, other vectors could thus be extracted from memory by other processing units which work simultaneously on different logic arrays. These vectors will be defined by different starting addresses and different ratios.

Figure 3:
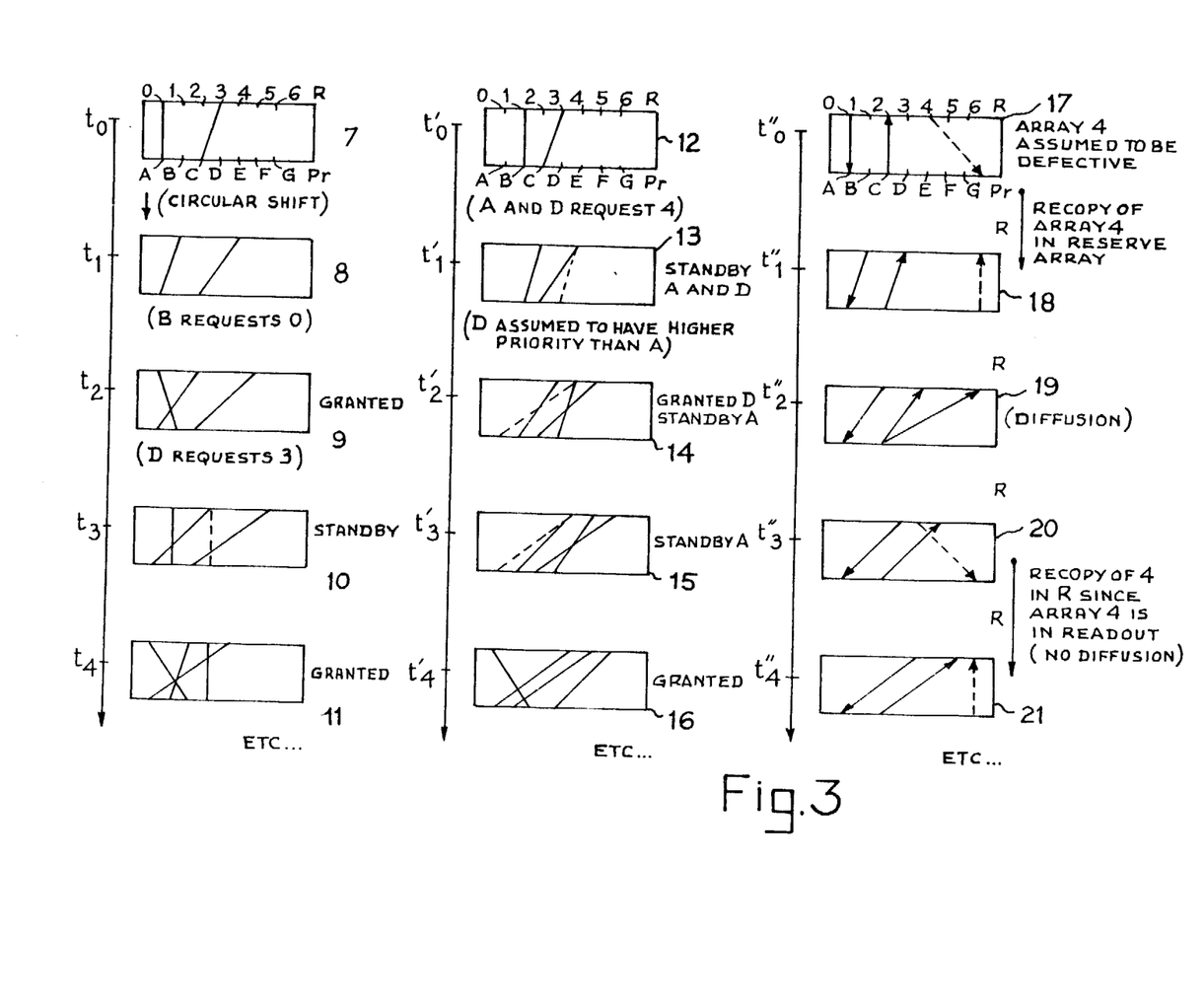
FIG. 3 is a diagram illustrating the principle o interconnection of the processing units with the logic arrays.

The schematic diagram of FIG. 3 illustrates examples of interconnection of a plurality of processing units on a plurality of logic arrays. In the examples of this figure, connection paths are established by a connection network which is capable of connecting a plurality of processing units designated respectively by the reference letters A, B, C, D, E, F, G independently on seven logic arrays of a memory designated respectively by the reference numerals 0, 1, 2, 3, 4, 5 and 6. In the configuration 7, the processing units A and C are connected respectively to the logic arrays 0 and 3 at the instant $t_o$.

At the following instant t₁ corresponding to configuration 8, the processing unit B requests access to the logic array 0 while the processing unit A is connected to the logic array 1 and the processing unit C is connected to the following logic array 4. At the following instant t₂ corresponding to configuration 9, processing-unit/$^B$ access to the logic array 0 is granted, the processing units A and C are connected respectively to the following logic arrays 2 and 4 and the processing unit D makes a request for access to the logic array 3. At the instant t₃ corresponding to configuration 10, the processing units A, B and C are connected respectively to the logic arrays 3, 1 and 6 but execution of connection of the unit D to the logic array 3 is deferred since the logic array 3 is engaged in the task of extracting data contained in its array by means of the processing unit A. At the instant t₄ corresponding to the following configuration 11, connection of the processing unit D to the logic array 3 is granted by reason of the fact that this latter has been freed by the unit A which is connected to the following logic array 4 at this instant.

At each successive switching instant of this operational sequence, all the processing units which have already been connected to a logic array are connected respectively to the following logic array in much the same manner as a "turnstile", starting from a first logic array designated by said processing unit, access being granted only if the logic array requested by this latter is free. On completion of data transfer, the processing unit involved in this transfer operation is disconnected. In order to guard against any potential danger of access conflicts, the control logic 4 manages all the access requests emanating from each processing unit while ensuring compliance with the rules of access of a processing unit within the "turnstile". In particular, in the system contemplated by the invention, a first access rule consists in considering that a processing unit which has already engaged in the "turnstile" necessarily has a priority claim to the logic array which it occupies with respect to other units which desire to enter the turnstile through the same logic array.

A second access rule specifies that, when at least two processing units desire access to one and the same logic array, this access is granted first to the unit which has top priority. Said second access rule naturally defines the form which this priority must assume for each particular configuration of the system.

Finally, a third access rule consists in satisfying at the same time all access requests which are not in conflict.

The application of these rules to other access configurations is illustrated in FIG. 3 with reference to the examples of configurations 12 to 21 of the interconnection networks and it will be assumed that their representation is sufficiently clear to dispense with any need for a more detailed description.

Since the memory is organized in juxtaposed physical arrays and thus endowed by these latter with a matrix structure in which each memory location can be detected or addressed only at the point of intersection of a line and a column of the matrix and since, in the block-addressing system employed by the invention, the memory locations containing the data or articles of each vector or data block are known only by addresses which satisfy an arithmetical address progression of memory locations along each line of the memory, each address processor $5_o$ to $5_p$ of the transmission system in accordance with the invention has the function of converting the arithmetical-progression addresses of the vectors known to each processing unit to an address which designates for each datum or article to be extracted the physical array which contains this latter and its location in the physical array.

Referring again to the structure of the memory space shown in FIG. 2, it is apparent that the conversion operation which serves to determine which array contains an article or a datum known by its location number in the memory is an operation which is the arithmetical modulo of the number of physical arrays contained in the memory. Thus in FIG. 2, in the case of the element 147, the operation 147 mod 25 produces the result 22 (22 being the remainder of the division of the number 147 by the number 25) and the number 22 corresponds to the number of the physical array in which the element 147 is located. In order to obtain the address of this element in the array, it is only necessary to perform a division of the integer 147 by the integer 25, which produces the quotient 5 and corresponds, for example, to the number of times it has been necessary to sweep the logic arrays $BL_0$ to $BL_4$ in order to store the element 147 in the memory and also in FIG. 2 to line 5 of the memory.

The consequently important function of each address processor is to carry out each time data or articles are extracted from memory a rapid division of the number of the first article or of the first datum by the modulo of the number of physical arrays. A single division appears necessary for initialization of the extraction since simple additions are sufficient thereafter to perform extraction of the following data or articles. In fact, if x and y designate the numbers of two elements or articles to be extracted from the same vector or block and assuming that they are stored in the same physical array of a memory containing 25 physical arrays, these numbers verify the relations $$x \bmod 25 = y \bmod 25 \qquad (2)$$

$$\text{hence } x-y = a.25 \qquad (3)$$

where a is a natural whole number.

Since these elements or attributes also belong to the same family of elements to be extracted, they also verify the relation $$x-y = b.7 \qquad (4)$$

where b is also a natural positive whole number. In consequence $$25\,a = 7\,b \qquad (5)$$

since 25 and 7 are incommensurable numbers and verify the relations $$a = 7\,c \qquad (6)$$

and $$b = 25\,c \qquad (b\,7)$$

where c is also a natural positive whole number.

In consequence, if a $j^{th}$ element to be extracted is in an array i at the address aj, it may be stated that the $(j+b)^{th}$ element is also in the array i at the address aj+a. Thus, for instance, the second element to be extracted from number 7 in FIG. 2 is at the address 0 and the $2+25\times1=27^{th}$ element (number 189) is also in the array 7 at the address $0+7\times1=7$ when considering here that c=1, aj=0, a=7 and B=25.

The principle of addressing which has just been described in the case of a two-dimensional memory of the type shown in FIG. 2 can naturally be extended to a three-dimensional memory. In either case the migrations of address of article to be extracted are always determined by the relation $A_K = A_1 + K.R$, where $A_K$ is the address of the $k^{th}$ transferred element, $A_1$ is the initial transfer address and R is the ratio (common difference) of the sequence $A_K$.

In the case, for example, of a line extraction from a starting address $A_l$ in a two-dimensional table, the address migration is carried out by transfer of the address elements $$A_K = A_1 + k.I$$

where I is the size of one column of the table.

In the case of a three-dimensional table of size $I \times J \times K$, the migration of one line will result in an address sequence $A_K = A_1 + k.(J.K)$ and in this case the ratio will be equal to $R = J.K$.

In order to extract a plane A from a threedimensional table represented with respect to orthonormal directions i, j, k defined by $A(1:I, 1:J, 1:K)$ if the plane A is parallel to two orthonormal directions i, j and has the coordinates $A(id:if, id:jf, k)$, the operation in fact consists in extracting the sequence of contiguous elements of said plane having a ratio $R = 1$ and separated by jumps having an amplitude I-(if-id).

On the other hand, if the plane A is parallel to the directions (i, k) and has the coordinates $A(id:if, j, kd:kf)$, the extraction operation in fact consists in extracting the sequences of elements having a ratio $R = 1$ and separated by jumps having an amplitude I-(if-id)=J.I.

In order to perform these migrations, it is therefore necessary in these cases to determine the address sequences with their ratio (common difference), the ratio being identical in the case of all the sequences of a migration, the amplitudes of jumps and the starting addresses $A_1$ in each series. The method accordingly consists in splitting-up each complete migration into subassemblies which are processed in an identical manner. In the case of each processed subassembly, a computation is performed in order to determine the number of the physical array on which the migration starts, the transfer starting address for each physical array and the addressing pitch between two consecutive accesses on the same array. On the basis of the start-of-transfer physical array number and the addressing pitch, a calculation also makes it possible to determine the starting address on each array, namely Adx, this calculation being performed locally on each array by an address processor. Each address processor which is connected to each logic array satisfies the request for migration in an independent manner with synchronizations at the beginning of each subassembly if necessary. In regard to the processing units, the extracted data must then be exchanged in the logical order of the tables extracted from memory. Irrespective of the case of extraction, a migration always begins with execution, by the processing unit which carries out this migration, of a preliminary step which consists in splitting-up the request into a subassembly $SE_i$ of address elements defined by a relation of the form $SE_i = \{A_K, KEE\ [1, K_{max}]; A_K = A_1 + KR\}$. During this step, the processing unit determines the ratio R, the number $K_{max}$ and the amplitude a of the jumps between two consecutive subassemblies $SE_i$ and $SE_{i+1}$.

The amplitude a of the jumps is defined by the relation $$a = (A_1)_{SE_{i+1}} - (A_{K_{max}})_{SE_i}$$

In the case of each subassembly $SE_i$, the migration is then split-up into three distinct steps, namely an initialization step (I), a transfer step (T) and a sequencing step (O). Depending on the direction of transfer, these steps do not take place in the same order. In the case of a migration from the memory 1 to a processing unit, said steps take place in the order (I)-(T)-(O) and in the case of a migration in the direction considered from processing unit to memory 1, they take place in the direction (I)-(O)-(T).

Initialization corresponds to computation of the start-of-transfer address and of the ratio in respect of each physical array. Sequencing corresponds to conversion of logic order of indices to physical order in one memory segment.

The initialization step consists in computing on each physical array the migration or transfer starting address Adx. If the notation Adb designates the migration starting address defined by a physical array address word Bdb, if the notation abd designates the address of a word in the array and R designates the addressing ratio of the arrays involved in migration with $R = p.b + s$, where s designates the displacement in physical array and p designates the displacement in an array, a first computation is performed in order to determine the first common multiple of the ratio R and of the number of arrays D. If P designates the lowest common multiple (LCM) obtained, the number P is related by the ratio R to the number b by the relations $$P = J.R = K.b$$

where J gives the number of arrays involved in the migration and K gives the addressing pitch on one array. Depending on whether the ratio R is a multiple of the number of logic arrays BL, of the number of physical arrays per logic array BP or of the total number of physical arrays B, then J will be able to assume one of the three values $J = b/b1$, $j = b/pb$ or $J = 1$. In all these cases, the migration rate will decrease by a factor J/b.

On the other hand, if R and b are incommensurable numbers, then $J = b$, the migration rate is nominal and takes place in segments of b elements, K being equal to R in this case. Under these conditions, an array X is concerned if the following relation is satisfied $$[(Bdb - X).J] \text{modulo } b = 0$$

The transfer starting address Adx in the physical array X concerned is then computed by performing the addition $$Adx = Adb + k.p + (K.s)/b$$

with $$k = [(X - Bdb).s^{-1}] \text{ modulo } b.$$

Figure 4:
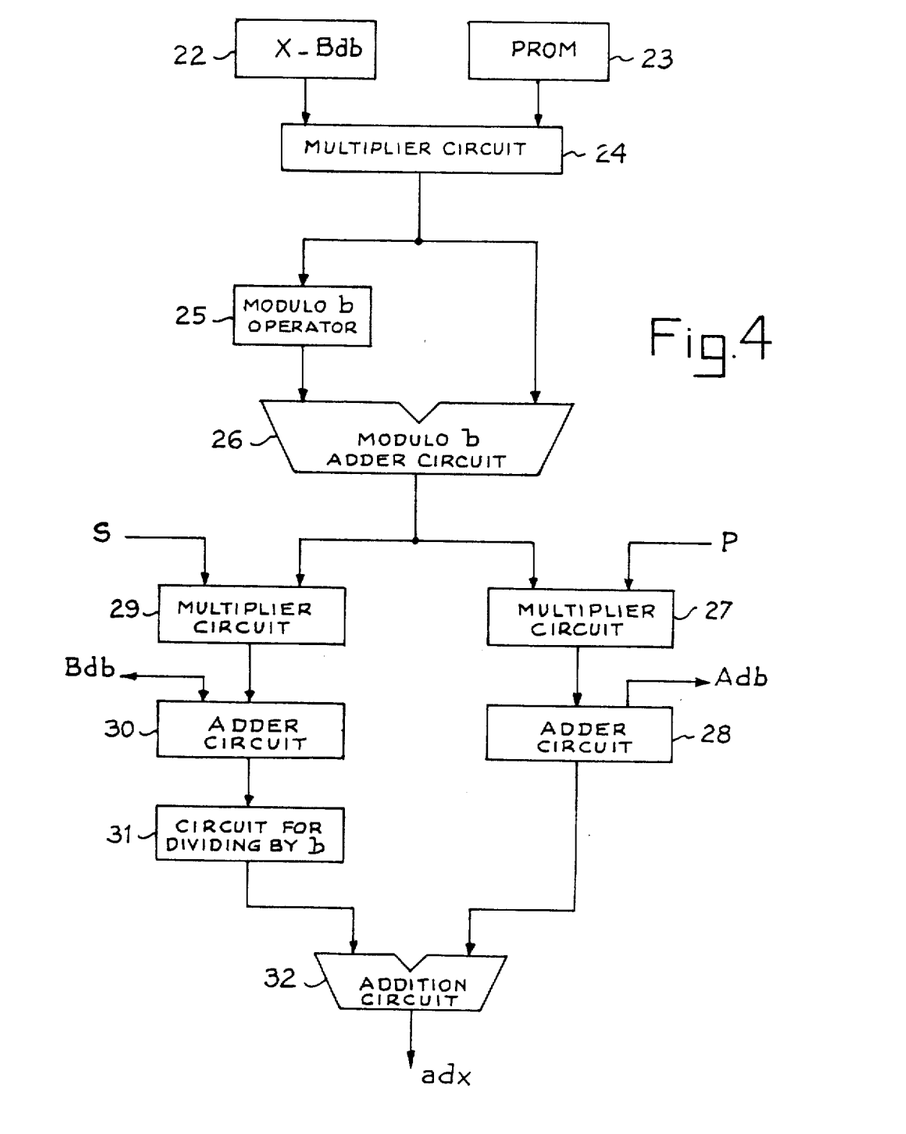
FIG. 4 illustrates an example of construction of an addressing processor in accordance with the invention.

An example of construction of an address processor for computation of a transfer starting address or a migration starting address is described below with reference to the diagram of FIG. 4. The address processor shown in FIG. 4 comprises two programmable read-only memories (PROMs) 22, 23, a multiplier circuit 24, a modulo b operator 25, a modulo b adder circuit 26, two multipliers 27, 29, three adder circuits 28, 30, 32 and a divider circuit 31. The assembly constituted by the two PROMs 22 and 23 and the circuits 24 to 26 execute computation of numbers having the logic order k of the address element Adx on the physical array X. The PROM 22 is addressed by the address word Bdb and contains a table of the differences X−Bdb. The PROM 23 contains a table of reciprocals of the shifts s in physical arrays and is addressed by the shift-s word. The multiplier circuit 24 performs the operation $(X - Bdb).s^{-1}$ and the modulo b operator 25 coupled between the output of the multiplier circuit 24 and an operand input of the adder circuit 26 performs the modulo b operation in order to obtain the number of logic order k of the element on the physical array X. The circuits 27, 28, 29, 30, 31 and 32 perform the function $[(Bdb+ks)/b]+kp+Adb$ in order to produce the required address Adx at the output of the circuit 32.

In order to carry out the addressing process performed by each address processor, the switches of the interconnection network are first placed by the control logic 4 on the paths requested by the processing units. The function of the control logic 4 is to ensure that each requesting unit has access on the one hand to the memory 1, that is, to the starting logic array to which it requires access and, on the other hand, to the following logic arrays on the "turnstile" principle explained earlier for the purpose of carrying out the address migration which it desires to perform.

Figure 5:
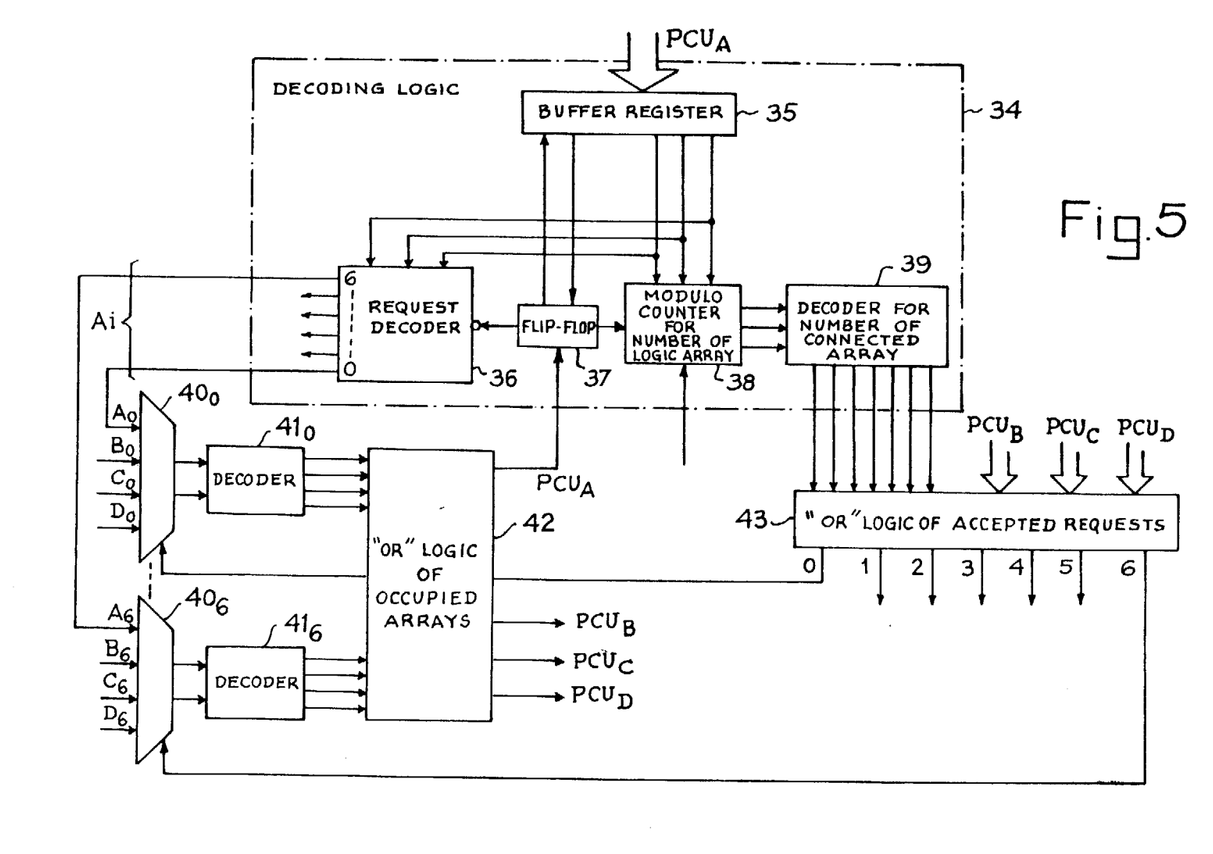
FIG. 5 shows an example of construction of the control logic.

The control logic which is shown in FIG. 5 makes it possible to manage all the requests of the processing units in order to prevent access conflicts and its operation complies with the three access rules set forth earlier in this specification. The control logic shown in FIG. 5 comprises a decoding logic unit 34 shown within a rectangular chain-dotted outline and comprising a buffer register 35 coupled via its outputs to a request decoder 36, to an acknowledgement flip-flop 37 and to a modulo counter for the number of logic arrays 38. The decoding logic unit 34 further comprises a decoder 39 for the number of the connected logic array. The request decoder 36 is connected at its outputs numbered from 0 to 6 to the respective inputs of six priority coders designated respectively by the references $40_0$ to $40_6$. The priority coders $40_0$ to $40_6$ are connected respectively at their outputs to the inputs of a priority decoder designated respectively by the references $41_0$ and $41_6$, each output of the priority decoders $41_0$ being connected to the inputs of an OR logic circuit of the occupied arrays 42. In addition, the outputs of the decoder 39 for the connected-array number are connected to respective inputs of an OR logic circuit 43 for accepted requests. Although the example of construction of FIG. 5 indicates only one decoding logic unit 34 coupled through the buffer register 31 to a processing unit designated by the reference $PCU_A$, it will naturally be understood that other decoding logic units of the type just described will be necessary in order to connect the control logic 4 to each of the other units ($PCU_B$ to $PCU_D$, for example) of the transmission system in accordance with the invention.

The operation of the control logic shown in FIG. 5 is as follows. The processing unit $PCU_A$ which is coupled to the decoding logic unit 34 deposits each request for access to a starting logic array of the memory 1 in the buffer register 35. This request contains the number of the starting logic array which, in the configuration of FIG. 5, is coded so as to permit addressing of seven logic arrays. Said request also contains a bit indicating the direction of transfer of data or of articles between the memory 1 and the processing unit $PCU_A$ and a connection control bit. The number of the requested logic array is decoded by the request decoder 36 and the request $A_i$ arrives via a lead denoted by 0 to 6 at the input of one of the priority coders $40_0$ to $40_6$ which receive on their other inputs the other access requests $[B_i]_{i=0^6}$, $[C_i]_{i=0^6}$, $[D_i]_{i=0^6}$ delivered by the other decoding logic units which are coupled to other processing units $PCU_B$ to $PCU_D$, for example. Each priority coder $40_0$ to $40_6$ chooses the request which has the highest priority and delivers it to the corresponding input of the decoders $41_0$ to $41_6$ at which said request is decoded, thus making it possible to indicate at the input of the OR logic circuit 42 of the occupied arrays the processing-unit request which has been accepted. The OR circuit 42 carries out processing in parallel of all the access requests. If in the case of FIG. 5 the request for connection of the processing unit $PCU_A$ is accepted, the OR logic circuit 42 of the occupied arrays resets the access-request flipflop 37 and this latter delivers a connection acknowledgement at one of its outputs and towards the processing unit $PCU_A$. The request of the processing unit $PCU_A$ is inhibited by said connection acknowledgement at the level of the request decoders 36 and then serves no further purpose. The modulo counter 38 for the number of logic arrays is loaded with the number of the starting logic array. The modulo counter 38 represents the turnstile described earlier. Said counter is incremented at each change in logic arrays in the direction of the circular permutation performed on all the logic arrays and consequently achieves modelized access by circular shifting to all arrays. The content of all the modulo counters 38 for the number of logic arrays in the other decoding logic units 34 is decoded by the number decoders 39 for connected (or occupied) arrays of the other decoding logic units 39 and is applied to the inputs of the OR logic circuit 43 which delivers at the output the list of occupied or connected arrays.

To revert to the example of extraction of FIG. 2, it can be observed that the elements or articles extracted from the memory are delivered at random (that is, in nonsequential order) and that, at the first turn, for example, the extraction of the first element of each physical array has delivered the series of articles 0, 126, 77, 28, 154, . . . , 98 and 49. In order to be utilizable, any such series of extracted articles must be restored to sequential order, this operation being performed in the manner shown in FIG. 6 by means of the rearrangement devices $6_0$ to $6_p$ of FIG. 1.

Figure 6:
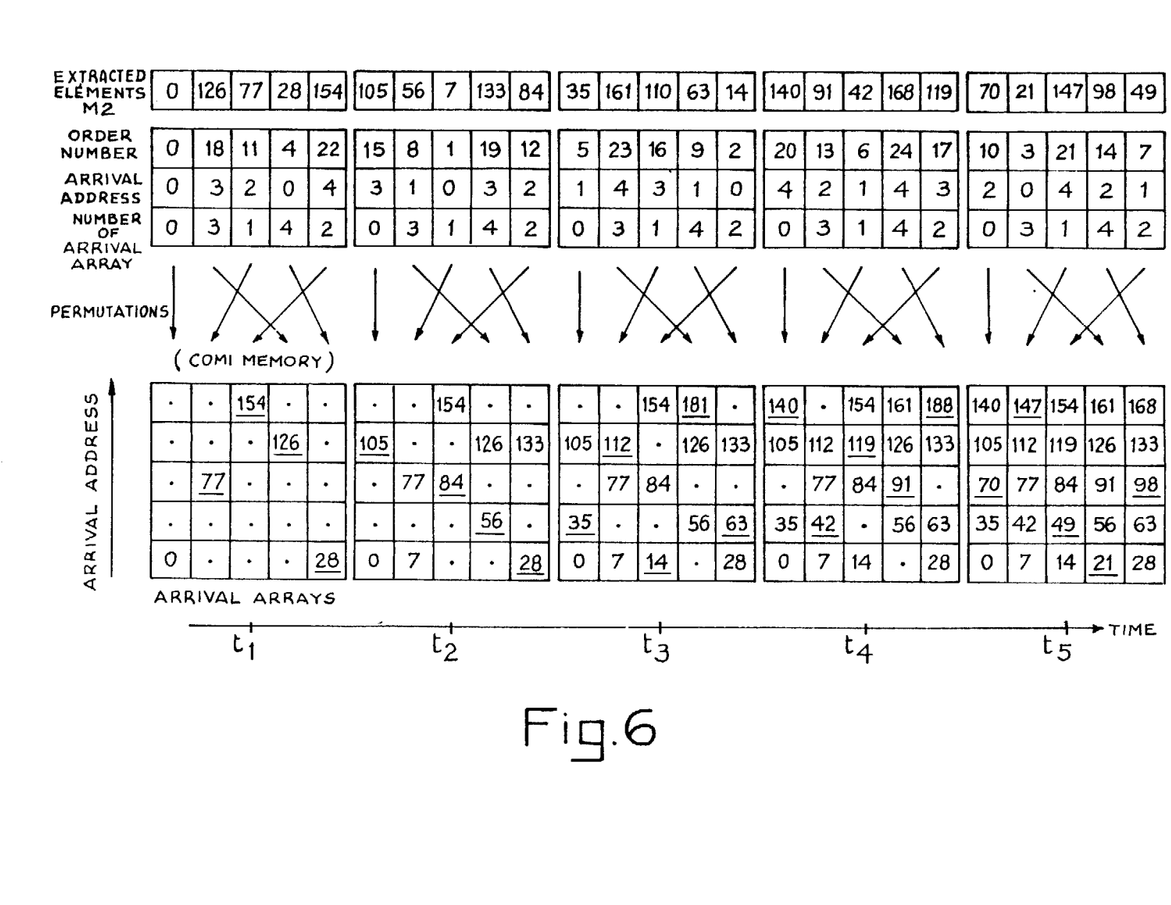
FIG. 6 is a diagram illustrating in the form of tables the principle of rearrangement of data in a buffer memory of the rearrangement device.

In order to carry out these rearrangements, each rearrangement device coupled to each processing unit is provided with a memory which, for the purposes of explanation of the rearrangement mechanism described hereinafter, is structured in the case of FIG. 6 for receiving twenty-five data words distributed over five memory arrays. In the example given in FIG. 6, the list of numbers extracted from the memory 1 appears on the first line of the table. This list corresponds to the list of extracted articles in the example of extraction shown in FIG. 2. The second line of FIG. 6 contains the sequence numbers of the articles extracted from the memory 1. The second and third lines indicate the lists of arrival addresses and arrival arrays of articles in the memory of the rearrangement device. In the case of FIG. 6, the arrival address of an article in the memory of the rearrangement device is obtained by means of a modulo-5 operation performed on the sequence number of the article and the arrival-array number is equal to the sequence number divided by 5. In the example illustrated, the element N° 154 has the sequence number 22 and its arrival array is obtained by dividing 22 by 5, which gives the number 4. The arrival address of this element is obtained by performing the modulo-5 operation on the sequence number 22 which consists in finding the remainder of the division of the sequence number 22 by the number 5, which gives the number 2.

In accordance with the mechanism shown in FIG. 6, the memory of the rearrangement devices is filled at the end of five successive instants of transfer of the arrival articles. The memory receives the first five articles 0, 126, 77, 28 and 154 at the instant $t=t_1$ and stores these latter in the manner described earlier at the addresses indicated in the arrival arrays, then receives and stores the next five articles in the same manner at the instant $t=t_2$, then receives and stores the next five articles at the instants $t_3$, $t_4$ and $t_5$ at which the total number of twenty-five articles has been collected. After the instant $t_5$, the recorded articles can be read by the processing unit in the memory of its rearrangement device by carrying out an address migration with a ratio of 1. By performing this read operation on the articles stored at the instant $t_5$ indicated in FIG. 6, the processing unit will be able to establish the fact that the articles thus read have been correctly replaced in the same order as the arrangement which existed in the memory 1.

Figure 7:
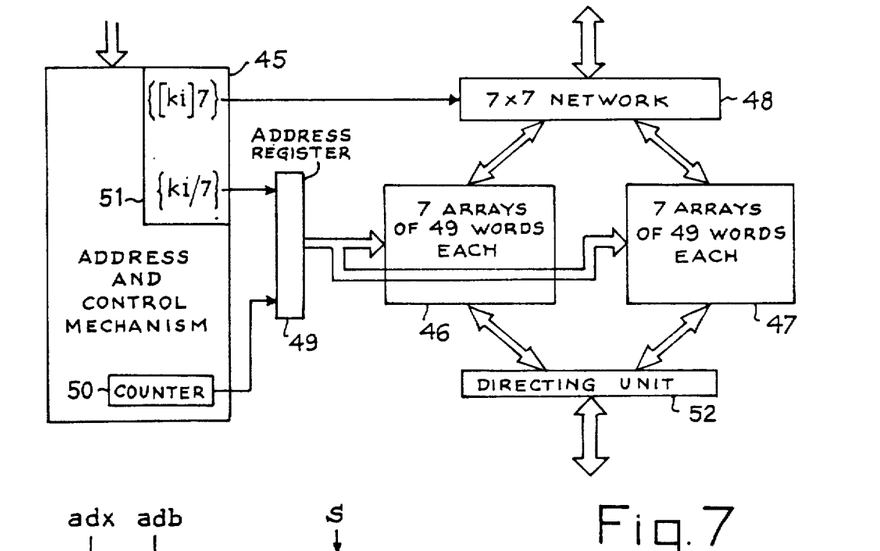
FIG. 7 is a diagram of construction of a data-rearrangement device.

One example of construction of the rearrangement device is given in FIG. 7. The device illustrated in this figure comprises an address and control mechanism 45 coupled to two memories 46 and 47 via a switching network 48 and an address register 49. The address and control mechanism 45 comprises an address counter 50 and an address computation device 51. A directing unit 52 has the function of switching the data between the processing unit coupled to the rearrangement devices and the memories 46 and 47 of said device. In the example of construction shown in FIG. 7, the memories 46 and 47 are organized in seven memory or storage arrays of forty-nine words, thus permitting rearrangements in a matrix of seven times forty-nine words.

Addressing of the memories 46 and 47 is carried out in a manner which is similar to addressing of the memory 1. As in the previous instance, the address of one element in an array is determined from a ratio S and from the starting address Adb of the elements to be extracted from b arrays. The address of the array of one element to be extracted is defined by the following relation $$Adx = (Adb + KS) \text{ modulo } b$$

where K represents the logical order of the element to be extracted and K is defined for each array by the relation $$K = [(Adx - Adb).S^{-1}] \text{modulo } b$$

When two arrays have contiguous addresses Adx and Adx+1, the values of K are as follows $$Adx \rightarrow K = [(adx - Adb).S^{-1}] \text{modulo } b$$

and $Adx+1 \rightarrow K+1 = [(Adx+1-Adb).S^{-1}].\text{modulo } b$ and $K+1 = [K+S^{-1}].\text{modulo } b$ In the case of FIG. 7, b is a multiple of 7 corresponding to the organization of the memories 46 and 47 composed of seven arrays of forty-nine cells each and the values $[Ki]_7$ which designate the numbers of the arrays are defined by the recurrence relations $$K, [(K+S^{-1})]_7, [(K+2.S^{-1})]_7 \ldots [(K+7S^{-1})]_7$$

In order to determine the address Ki/7 of each article in an array, it is only necessary to divide the number of the array by the modulo b of the number of arrays, namely 7 in the case of FIG. 7.

Figure 8A:
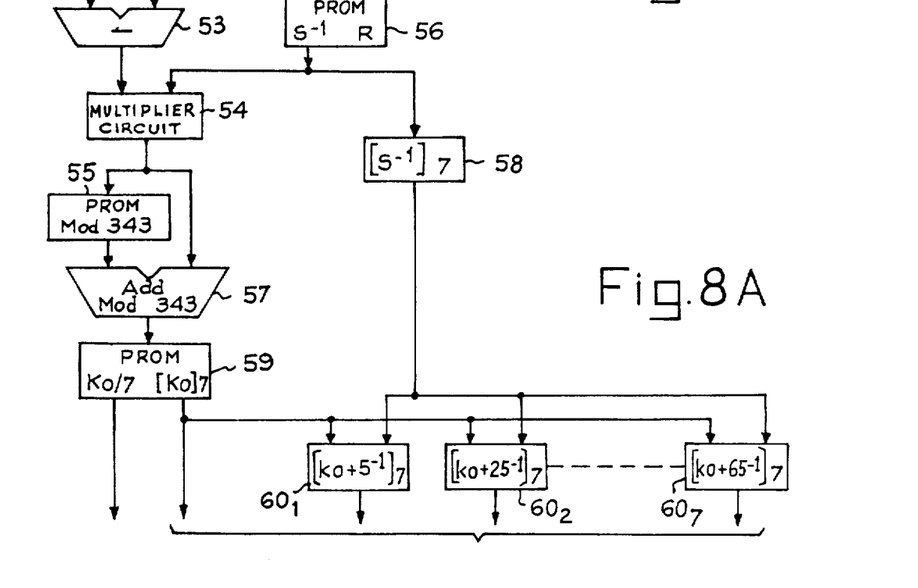
FIGS. 8A and 8B are diagrams of construction of the device for addressing and control of the buffer memories of a rearrangement device.
Figure 8B:
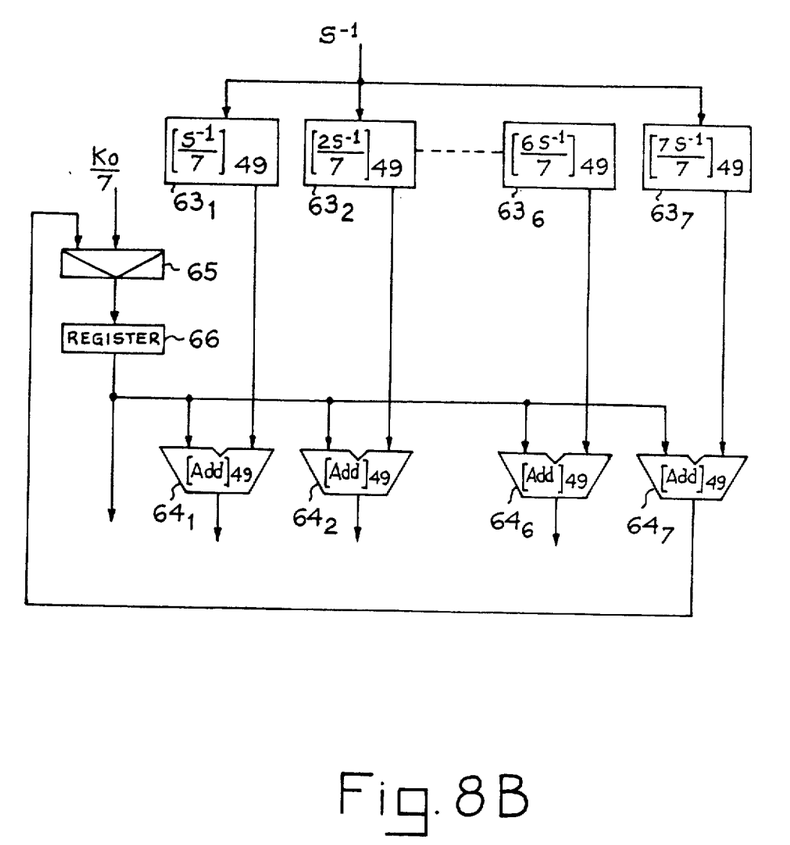

One example of construction of the addressing and control mechanism 51 is shown in FIGS. 8A and 8B. That portion of the addressing mechanism which is shown in FIG. 8A comprises an adder circuit 53, a multiplier circuit 54, a programmable read-only (PROM) memory 55, an adder circuit 57 and a PROM 59 which are coupled in series in this order, two PROMs 56 and 58 coupled in series in this order, and PROMs $60_1$, $60_2$ and $60_7$. The addresses Adx and Adb are applied respectively to the first and second operand inputs of the substracter circuit 53 which applies the result of the subtraction performed on the addresses Adx and Adb to a first operand input of the multiplier circuit 54. The ratio s is applied to the addressing inputs of the PROM 56 which delivers by means of a table the reciprocal $S^{-1}$ of the ratio applied to said addressing inputs so as to apply said ratio to the second operand input of the multiplier circuit 54. The result of the multiplication performed by the multiplier circuit 54 is applied to the addressing inputs of the PROM 55 and to a first operand input of the adder circuit 57. The output of the PROM 55 is applied to a second operand input of the adder circuit 57 which delivers at its output the desired number K. The result obtained at the output of the adder circuit 57 is applied to the addressing inputs of the PROM 59 which, by means of a table, performs the division of the number K by the modulo of the number of arrays b of the memories 46 and 47. The PROM 59 delivers the value of K corresponding to the array 0. This value of K is applied to the first addressing inputs of the PROMs $60_1$ to $60_7$ which are addressed on their second addressing input by the output of the PROM 58 which contains a table of all the modulo-7 reciprocals of the remainder s. The memories $60_1$ to $60_7$ contain tables which make it possible to perform the additions $[K+S^{-1}]_7, [K+2S^{-1}]_7 \ldots [K+7S^{-1}]_7$ defined earlier in order to define the numbers of the logic arrays for storage of the elements or articles in the memory arrays.

The addresses of the articles to be stored in each memory array are determined from the address computation device shown in FIG. 8B which comprises an assembly of PROMs $63_1$, $63_2 \ldots 63_6$ and $63_7$, an assembly of modulo-49 adder circuits designated by the references $64_1$ to $64_7$, a switching circuit 65 and a register 66. The addresses corresponding to the seven arrays of a storage device or memory are obtained at the output of the adder circuits $64_1$ to $64_7$. The first operand inputs of the adders $64_1$ to $64_7$ are connected to the outputs of the PROMs $63_1$ to $63_7$ which contain tables for dividing by seven the reciprocal of the modulo-49 numbers $S^{-1}$, $2S^{-1} \ldots 6S^{-1}$ and $7S^{-1}$. The quotient by 7 of the number K0 corresponding to the array 0 is applied to the second operand inputs of the adder circuits $64_1$ to 64₇ via the switching circuit 65 and the register 66. The output of the adder circuit 64₇ is connected to a second input of the switching circuit 65 in order to produce migration of the addresses within the memories 46 and 47.

What is claimed is:

1. A system for simultaneous transmission of vectors of data blocks between plural memory cells and a plurality of data-processing units designed for asychronous operation with respect to each other, said system comprising:
   a group of memory cells composed of a whole number N of storage logic arrays each comprising any whole number n of physical arrays each having q storage locations;
   an interconnection network interposed between the group of memory cells and the data-processing units for simultaneously establishing connections between the memory arrays and said processing units;
   a control device coupled to said interconnection network for controlling the connection paths within the interconnection network; a plurality of addressing logic devices each controlled respectively by one of the plurality data-processing unit for addressing the locations of the memory to which each unit requests access and performing transfer of the vectors or data blocks contained in the corresponding locations; wherein the N.n physical arrays of the memory being juxtaposed and numbered in order of natural integers 0, . . . so as to form an ordered matrix base of storage locations, each storage location in a physical array being located at the point of intersection of a line and a column of the matrix base and being also numbered on each line in the order of increasing magnitude of the matural integers from the start-of-line location contained in the first physical array denominated as the 0 array of the momory to the end-of-line location contained in the last physical array of the memory, all of the start-of-line locations of the memory being located within a first physical array; wherein each of said addressing logic device comprises:
   means for determining the address of each location in the physical array by computing the modulo address (N.n) of each location in the physical array from its sequence number in the memory to allow for the multiple data-processing units to access the same storage array on a simultaneous basis; wherein said control logic device comprises means for establishing a connection between a requesting data-processing unit and the storage logic array containing the computed modulo address of the start of the vector or of the data block to be transferred and switching means in said control logic device for successively switching the requesting unit to the following storage logic arrays at the end of each data transfer between a logic array of the memory and the data-processing unit without interruption until the transfer of the last data item of the block or of the vector.

2. A system according to claim 1, wherein the number n of physical arrays within a logic array is equal to 1.

3. A system according to claim 1, wherein the number N of arrays of the memory is an incommensurable whole number which can be divided only by itself.

4. A system according to claim 1, further comprising:
   a device for rearrangement, coupled to said group of memory cells and each of said data-processing units, of the data extracted from the memory. each data-processing unit.

5. A system according to claim 4, wherein the devices for rearrangement of the extracted data are interposed between the interconnection network and the data-processing units and each comprise two rearrangement memories organized in p arrays of q words in each case as well as an addressing and control device for storing the extracted data derived from the memory in the logical order of storage of said data in said memory.

6. A system according to claim 1, wherein the number of physical arrays Nxn is so determined that highest common factor of the number of physical arrays and of the ratio R is limited to a small number of prime factors.

* * * * *